US006968916B2

(12) United States Patent
Bergman

(10) Patent No.: US 6,968,916 B2
(45) Date of Patent: Nov. 29, 2005

(54) AIR INTAKE SYSTEM FOR A VEHICLE

(75) Inventor: Ron Bergman, McIntosh, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 18 days.

(21) Appl. No.: 10/007,222

(22) Filed: Nov. 2, 2001

(65) Prior Publication Data

US 2002/0088656 A1    Jul. 11, 2002

Related U.S. Application Data

(60) Provisional application No. 60/245,886, filed on Nov. 3, 2000.

(51) Int. Cl.[7] .............................................. B62D 27/00
(52) U.S. Cl. .................... 180/68.3; 180/68.1; 180/69.2
(58) Field of Search ............................. 180/68.1, 68.3, 180/69.2, 69.24; 296/190.09; 406/113; 123/41.56, 123/41.58; 68/41

(56) References Cited

U.S. PATENT DOCUMENTS

| | | | | |
|---|---|---|---|---|
| 2,881,860 | A | | 4/1959 | Ternes |
| 4,249,626 | A | * | 2/1981 | Fields et al. ............... 180/68.1 |
| 4,509,926 | A | * | 4/1985 | Jacobson .................. 440/88 R |
| 4,778,029 | A | * | 10/1988 | Thornburgh ................ 181/229 |
| 5,129,473 | A | * | 7/1992 | Boyer ....................... 180/68.1 |
| 5,152,365 | A | | 10/1992 | Aoshima |
| 5,174,258 | A | | 12/1992 | Tanaka |
| 5,195,484 | A | * | 3/1993 | Knapp ..................... 123/198 E |
| 5,199,522 | A | * | 4/1993 | Martenas et al. .......... 180/68.3 |
| 5,251,718 | A | * | 10/1993 | Inagawa et al. ............ 180/190 |
| 5,689,953 | A | * | 11/1997 | Yamashita et al. ............ 60/316 |
| 5,794,733 | A | | 8/1998 | Stosel et al. |
| 6,056,075 | A | * | 5/2000 | Kargilis ..................... 180/68.1 |
| 6,167,862 | B1 | * | 1/2001 | Powell et al. ............ 123/198 E |
| 6,283,242 | B1 | * | 9/2001 | Umeoka et al. ............ 180/219 |
| 6,302,228 | B1 | * | 10/2001 | Cottereau et al. .......... 180/68.1 |
| 6,422,201 | B1 | * | 7/2002 | Yamada et al. ............. 123/336 |
| 6,439,328 | B1 | * | 8/2002 | Vaillancourt et al. ...... 180/68.1 |
| 6,484,835 | B1 | * | 11/2002 | Krapfl et al. .............. 180/68.3 |

* cited by examiner

*Primary Examiner*—Christopher P. Ellis
*Assistant Examiner*—Christopher Bottorff
(74) *Attorney, Agent, or Firm*—Black Lowe & Graham; Darren J. Jones

(57) ABSTRACT

An air intake system for a vehicle, having a hood that defines at least one intake aperture therethrough. The hood may be configured such that the intake apertures have substantially zero exposed area in the upper surface of the hood, such that debris cannot fall from directly above the hood into the intake apertures. A screen is engaged with the hood. The screen may define at least one screen aperture therethrough. A screen mount may be disposed within the screen aperture, and is engaged with the lower surface of the hood and with the screen. The air flow path may be shaped such that air must rise near the intake apertures and fall near the outflow aperture. The air intake system may include an air plenum adapted to supply air to an engine.

23 Claims, 5 Drawing Sheets

AIR INTAKE SYSTEM FOR A VEHICLE

This application claims the benefit of U.S. Provisional Application No. 60/245,886, filed Nov. 3, 2000 and entitled AIR INTAKE SYSTEM FOR A VEHICLE, which is in its entirety incorporated herewith by reference.

BACKGROUND OF THE INVENTION

This invention relates to an air intake system for a vehicle, and more particularly to an air intake system for a vehicle such as a snowmobile that resists drawing in debris, and that is less noisy for a vehicle operator.

Known motorized vehicles require air intake systems to provide air to an engine, most commonly an internal combustion engine. Conventionally, vehicles are equipped with simple "straight-line" air intakes that draw air in an essentially linear path from the outside to the engine. This is unsatisfactory for a variety of reasons.

A path that permits the flow of air may also permit the flow of debris, such as dust, snow, rain, leaves, etc. As engines are typically very sensitive to contaminants, such debris can cause malfunctions or damage if drawn in.

In addition, for many vehicles such as snowmobiles it is common to position the main air intakes near the operator, for reasons based on the structure and orientation of the engine. However, because it leads directly to the engine, such an air intake provides a ready path for engine noise to reach the operator. This can cause discomfort for the operator.

SUMMARY OF THE INVENTION

Therefore it is the purpose of the present invention to overcome the deficiencies of the existing designs. It is the purpose of the present invention to provide an air intake system configured so as to minimize the intake of debris, and to minimize the noise emitted near the operator.

An embodiment of an air intake system in accordance with the principles of the present invention includes a hood adapted to be connected to a vehicle.

The hood comprises first and second portions. The second portion is engaged with the first portion, and is vertically displaced from the first portion. Thus, the second portion is essentially a raised or depressed area of the hood. The first portion also underlies the second portion.

The first and second portions cooperate to form at least one intake aperture through the hood.

The first and second portions may be separate pieces that are fitted and/or secured together. Alternatively, the hood may be formed as a single piece, with the first and second portions being integral with one another.

The second portion is shaped so as to extend horizontally beyond the intake apertures, such that the intake apertures advantageously have zero exposed area in the upper surface of the hood. That is, the intake apertures cannot be seen from above the hood. In this configuration, debris cannot fall directly into the intake apertures from above. This is of particular importance with regard to snow, ice, and other debris. Additionally, the intake apertures are unlikely to become blocked or filled with accumulating debris. This is of importance with regard to storage of the vehicle, when snow can accumulate from above onto the upper surface of the vehicle.

The air intake system also comprises a screening device, such as a mesh type screen or a filter material, hereinafter referred to as a "screen", engaged with the lower surface of the second portion in such a way that the lower surface and the screen define a cavity therebetween. The screen defines at least one screen aperture therethrough.

The air intake system may further comprise a screen mount. The screen mount is engaged with the lower surface of the second portion of the hood, and is engaged with the screen at the screen aperture. The screen mount defines at least one mount inlet located between the screen and the lower surface of the second portion of the hood, and at least one mount outlet. The mount inlet and the mount outlet are in communication with one another such that air may flow therethrough. Thus, air may flow from the cavity defined between the second portion of the hood and the screen, into the mount inlet, through the screen mount, and out through the mount outlet.

The hood, screen, and screen mount cooperate to define at least one air path from the intake apertures to the mount outlet. The cavity comprises a portion of the air flow path. The hood, screen and screen mount are configured so that the air flow path is non-linear. Preferably, the air flow path inclines upwards near the intake apertures, and inclines downwards near the mount outlet, so that air must rise and then fall as it passes through the air flow path. Such an air flow path tends to minimize the amount of debris carried from the intake apertures to the mount outlet, and reduces the passage of sound therethrough.

In particular, an air flow path that is configured such that air travels upward through the screen is especially advantageous, since it is particularly effective in preventing debris from passing through the air flow path. Also, when the air flow path has such a configuration, debris that is stopped by the screen falls naturally from the screen, making such an air intake system resistant to the accumulation of debris, and at least partially self-cleaning.

Preferably, the intake apertures and screen mount are located far from the operator, so as to further minimize perceived engine noise. Preferably, the intake apertures are located on the opposite side of a windshield from the operator.

The air intake system may also comprise an air plenum engaged with the screen mount. The air plenum serves to baffle the air, further restricting the emission of noise from the engine.

BRIEF DESCRIPTION OF THE DRAWINGS

Like reference numbers generally indicate corresponding elements in the figures.

DETAILED DESCRIPTION OF THE PREFERRED EMBODIMENT

Figure 4:
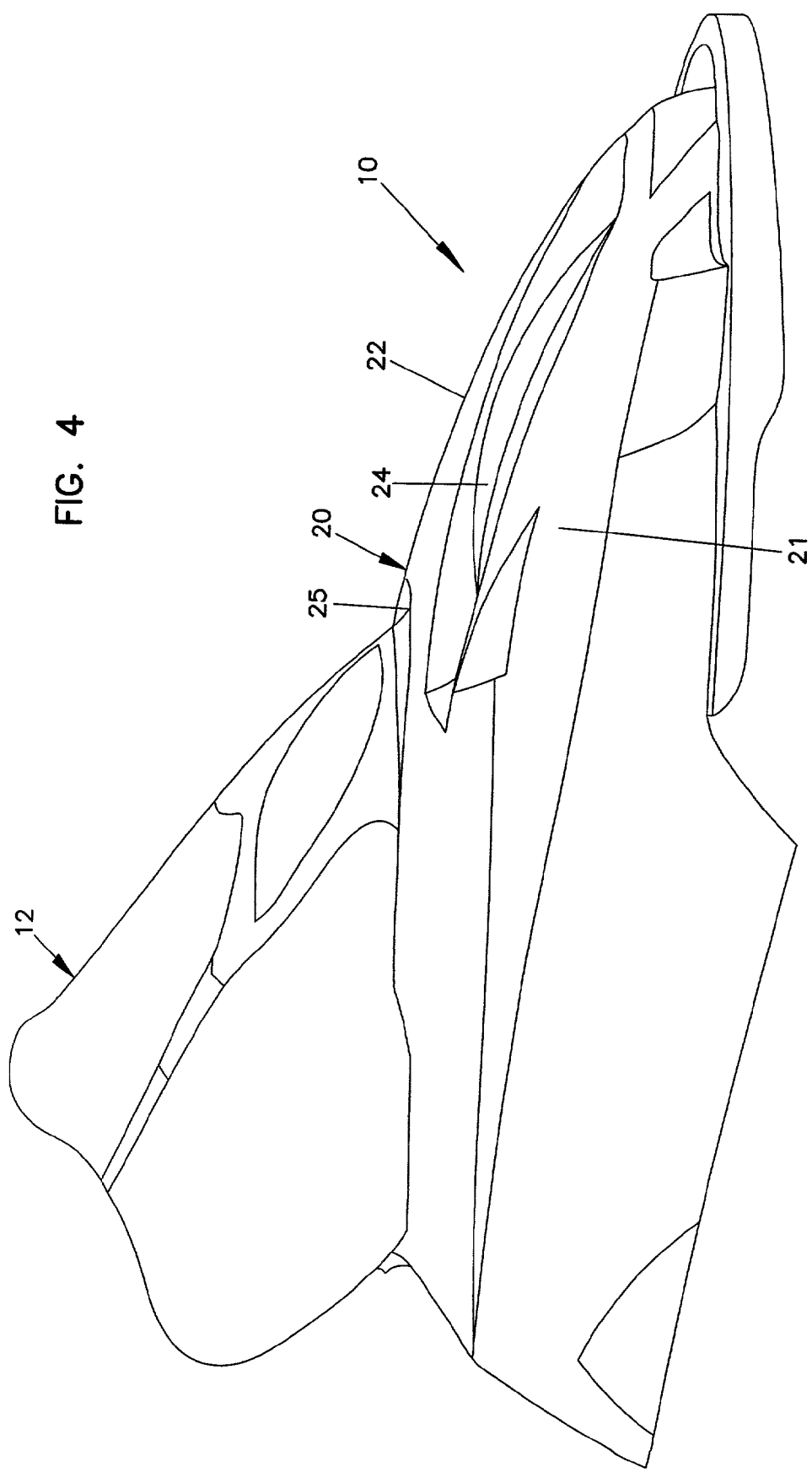
FIG. 4 is a perspective view of an embodiment of an air intake system.
Figure 5:
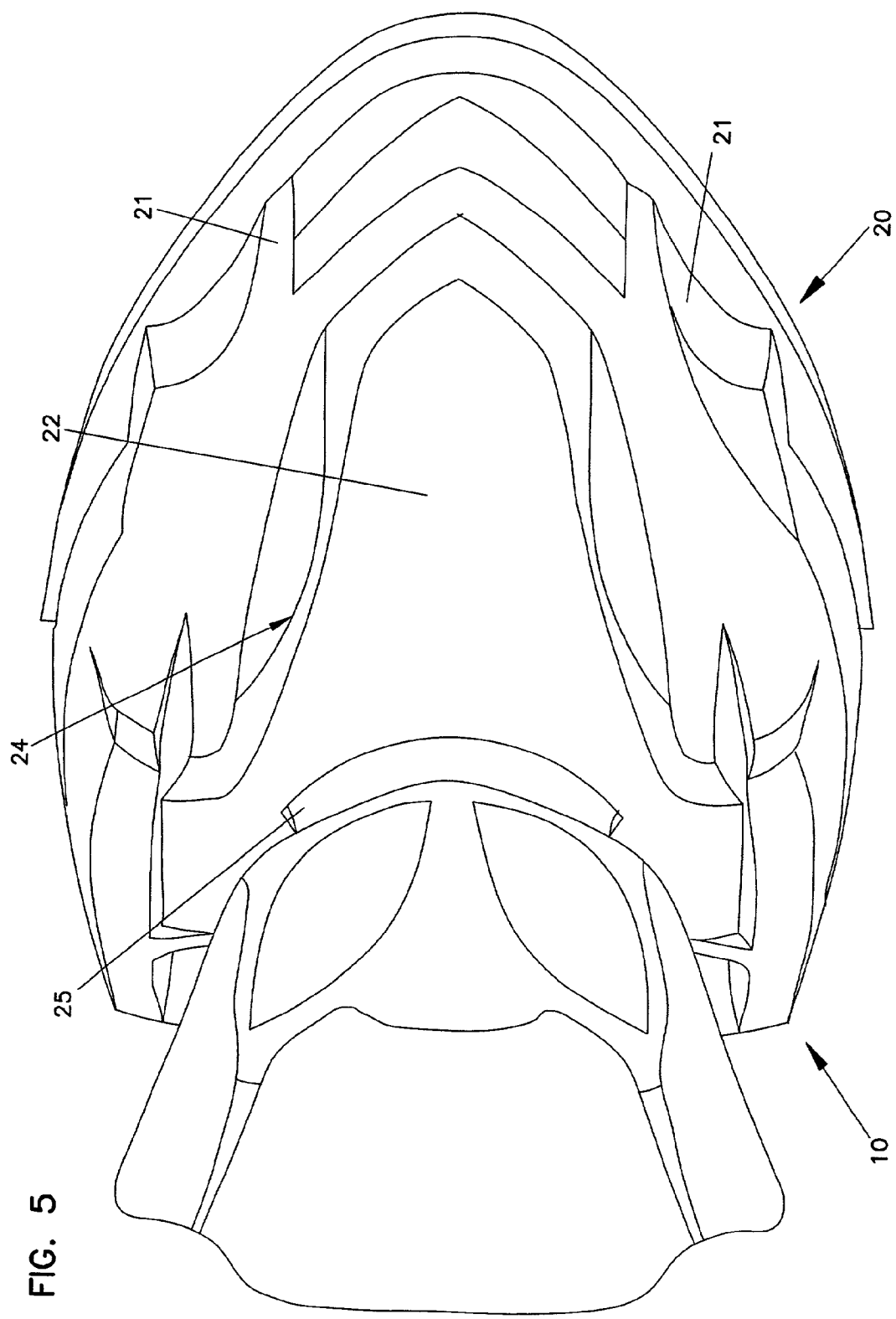
FIG. 5 is another perspective view of an embodiment of an air intake system.

Referring to FIGS. 4 and 5, the present invention comprises an air intake system 10 suitable for use with a vehicle. As illustrated, the air intake system 10 is configured so as to be suitable for use with a snowmobile. Details of the engine, steering system, etc. are omitted for clarity. It will be apparent to those knowledgeable in the art that the present invention may also be suitable for use with other vehicles, including but not limited to personal watercraft, etc. Suitable vehicles are well known, and are not described herein in detail.

The air intake system 10 comprises a hood 20 adapted to be engaged with a vehicle. The hood 20 comprises a first portion 21 and a second portion 22. The second portion 22 is engaged with the first portion 21, and is vertically displaced from the first portion 21. That is, the second portion 22 is essentially a raised area of the hood 20, while the first portion 21 is that portion of the hood other than the raised second portion 22.

Figure 1:
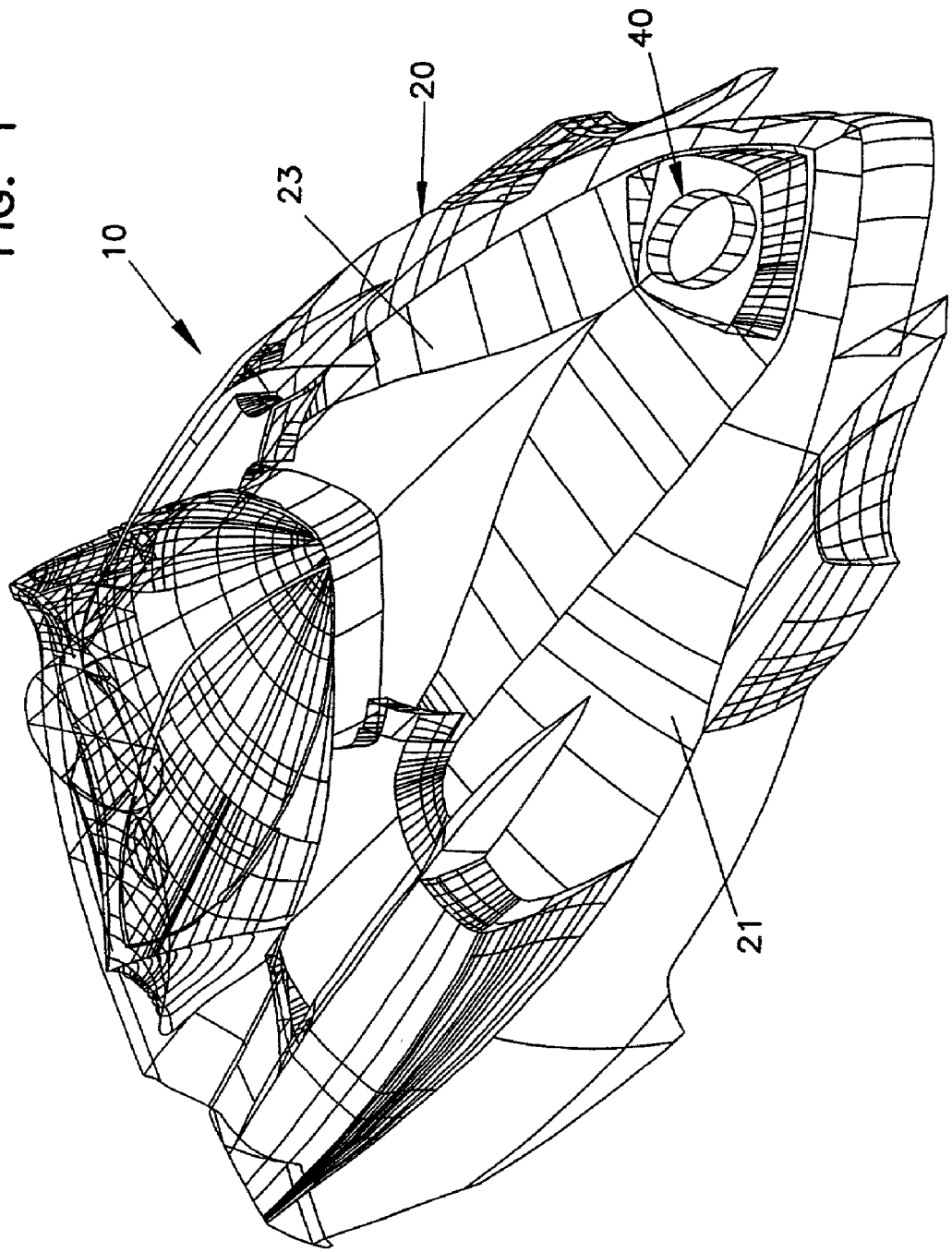
FIG. 1 is a perspective view of an embodiment of an air intake system in accordance with the principles of the present invention, without the second portion.
Figure 3:
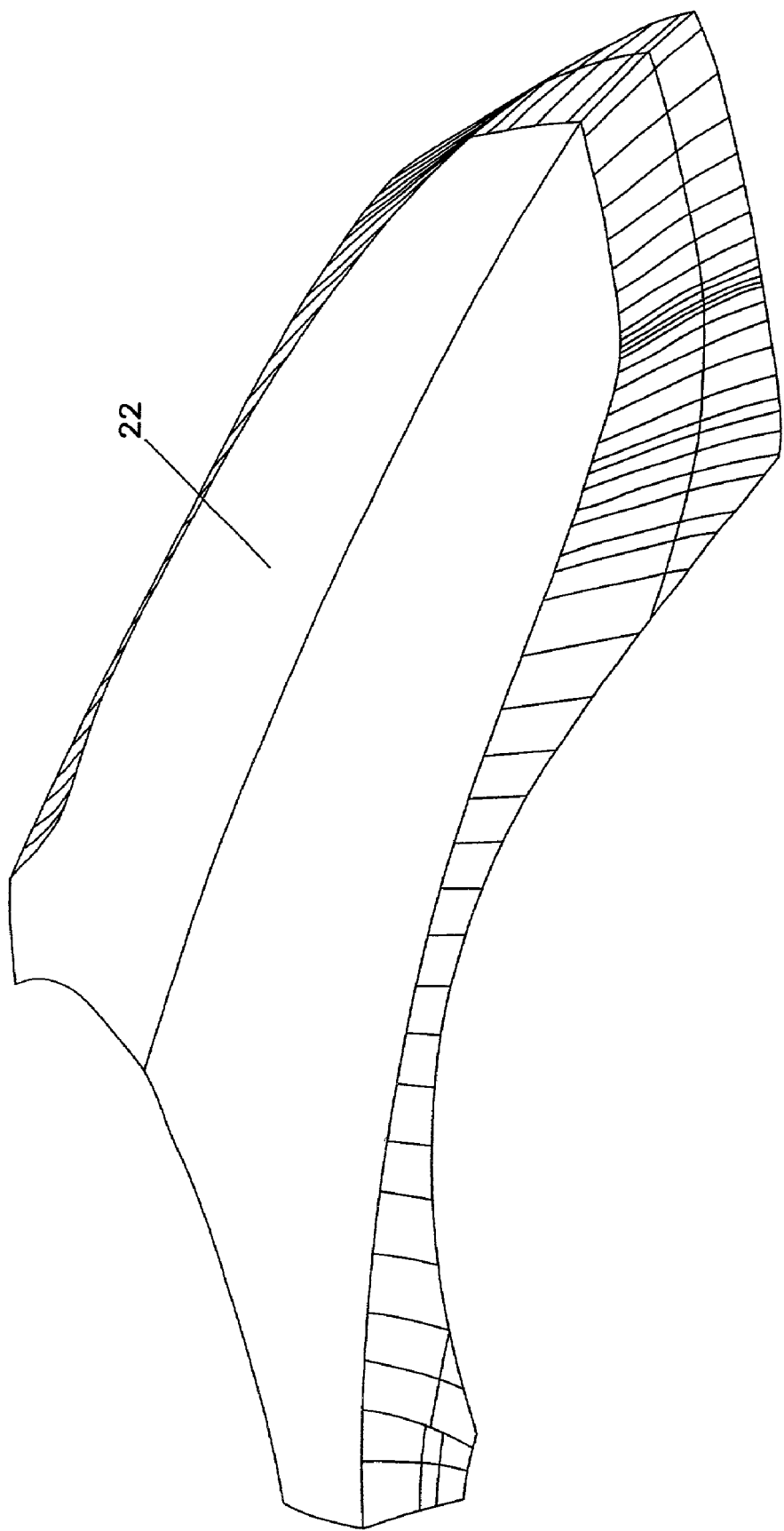
FIG. 3 is a perspective view of an embodiment of the second portion of the hood.

As may be seen from FIGS. 1, 3, and 5, the first portion 21 extends horizontally across the area over which the second portion 22 extends when in place on the first portion 21.

In the embodiment illustrated in FIGS. 1 and 3, the first portion 21 and the second portion 22 are separate pieces that are connected together to form the hood 20. The first portion 21 of the embodiment is illustrated in FIG. 1, and the second portion 22 is illustrated separately in FIG. 3. However, a hood 20 formed as a single piece, wherein the first and second portions 21 and 22 are integral with one another, may be equally suitable.

Likewise, a hood 20 that is formed as more than two pieces may be equally suitable. In particular, the underlying part 23 of the first portion 21 over which the second portion 22 extends may be a separate piece from the remainder of the first portion 21.

Furthermore, although the embodiment of the hood 20 shown has a particular streamlined shape for reasons of efficiency and aesthetics, it will be apparent to those knowledgeable in the art that a wide variety of other shapes may be equally suitable.

In some embodiments wherein the first and second portions 21 and 22 are separate pieces, the second portion 22 may be removable from the first portion 21.

Figure 2:
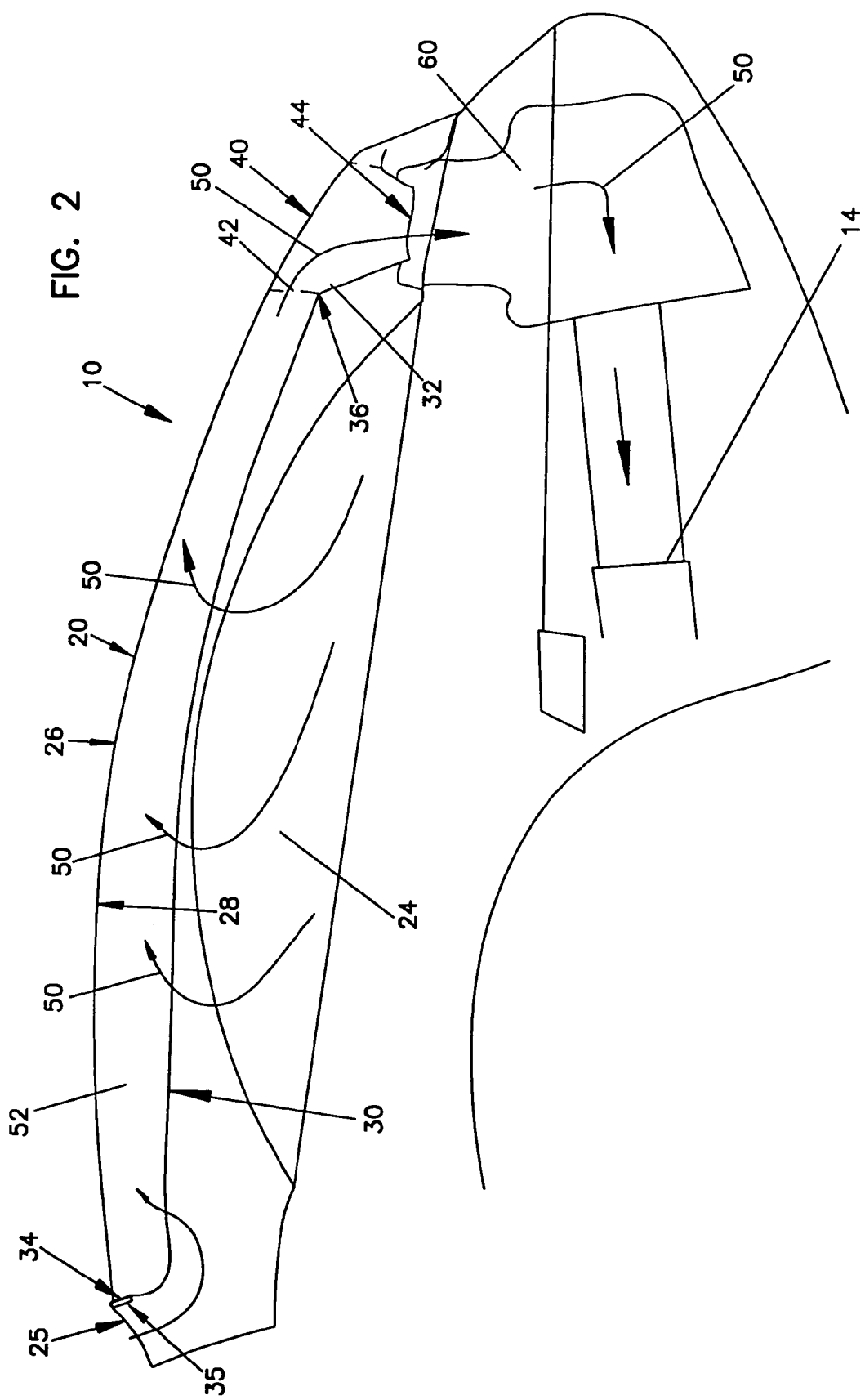
FIG. 2 is a longitudinal cross section of the air intake system shown in FIG. 1.

As is most easily seen in FIGS. 4 and 5, the first and second portions 21 and 22 cooperate to define at least one intake aperture 24 through the hood 20. Referring to FIG. 2, the second portion 22 of the hood 20 comprises an upper surface 26 and a lower surface 28. As shown in FIGS. 4 and 5, the second portion 22 is configured so that it extends horizontally beyond the intake apertures 24, such that the intake apertures 24 have substantially zero exposed horizontal area. With the hood 20 oriented for engagement with a vehicle, the intake apertures 24 have substantially zero area of projection on a plane located above the hood 20 and generally parallel to a surface on which the vehicle would rest. With such a configuration, debris cannot fall from directly above the hood 20 into the intake apertures 24. Additionally, debris falling from directly above the hood 20 cannot block or accumulate within the intake apertures 24.

The embodiment of the hood 20 shown comprises intake apertures 24 in particular shapes. Advantageously, some or all of the intake apertures 24 are far from the operator of the vehicle, so as to minimize engine noise as perceived by the operator. As illustrated in FIG. 4, the intake apertures 24 are defined in a portion of the hood 20 on the opposite side of a windshield 12. Thus, the windshield 12 is disposed between the intake apertures 24 and an operator. This is particularly advantageous in reducing engine noise as perceived by the operator. However, it will be apparent to those knowledgeable in the art that a variety of shapes, sizes, locations, and numbers of intake apertures may be equally suitable.

The air intake system 10 further comprises a screen 30. The screen 30 allows air to flow therethrough, but prevents debris from passing therethrough and reaching the engine air inlet 14. The outer edge 34 of screen 30 is in engagement with the lower surface 28 of the hood 20, such that the lower surface 28 and the screen 30 cooperate to define a cavity therebetween.

The screen 30 may be removably mounted to the lower surface 28 of the second portion 22.

The outer edge 34 of the screen 30 may comprise a edge mounting mechanism 35 to enable convenient engagement of the screen 30 with the lower surface 28. A variety of edge mounting mechanisms 35 may be suitable for engaging the screen 30 with the lower surface 28. For example, a mounting rim or a screen holder may be suitable. However, these mechanisms are exemplary only, and other mechanisms may be equally suitable.

The screen 30 defines at least one screen aperture 32 therethrough, the screen aperture having an inner edge 36.

The air intake system 10 may also comprise a screen mount 40 disposed within the screen aperture 32. The screen mount 40 may be engaged with at least one of the lower surface 28 and the screen 30. Advantageously, as illustrated in FIG. 2, the screen mount 40 is engaged with both the screen 30 and the lower surface 28. Alternately, the screen mount 40 may be engaged with a plenum 60.

The screen mount 40 defines at least one mount inlets 42 between the lower surface 28 and the screen 30. The screen mount also defines at least one mount outlet 44. As illustrated in FIG. 2, the mount outlet 44 is below the screen 30. However, the mount outlet 44 could also be above the screen 30, or at the same level as the screen 30. The mount inlets 42 and the mount outlet 44 are in communication with one another such that air may flow therethrough.

The screen mount 40 serves as a durable contact point for the screen 30 and the mount outlet 44. The screen 30 may be secured to the screen mount 40 by gluing, welding, etc. The screen mount 40 may be generally cylindrical in form, and may be made of plastic, metal, or other suitable material. The screen mount 40 may be secured by welding, gluing, etc. or may be part of an integrally formed structure. The mount inlets 42 may be in the form of apertures or notches in the upper portion of the wall of the screen mount 40.

It is pointed out that the screen mount 40 is exemplary only, and that embodiments of the air intake system 10 without a screen mount 40 may be equally suitable.

In the embodiment shown, a screen mount 40 is illustrated that is engaged with the hood 20 and the screen 30 and removably engaged with the plenum 60. However, it will be apparent to those knowledgeable in the art that this configuration of outflow mount is exemplary only, and that other configurations of outflow mount, or no outflow mount at all, may be equally suitable.

The air intake system 10 defines an air flow path 50 therein, extending from the intake apertures 24 to the engine air inlet 14. As previously noted, the screen 30 is spaced apart from the lower surface 28, so that the screen 30, the lower surface 28, and the outflow mount 40 cooperate to define a cavity 52. The cavity 52 comprises a portion of the air flow path 50.

The air flow path 50 extends from the intake apertures 24, through the screen 30, and through the cavity 52 to the mount inlets 42, through the screen mount 40, and to the mount outlet 44.

The outer edge 34 of the screen 30 is in contact with the lower surface 28 of the second portion 22 above the intake apertures 24, and the inner edge 36 of the screen 30 is in contact with the screen mount 40 below the mount inlets 42 so as to bound the air flow path 50. The air entering through the intake apertures 24 thus passes through the screen 30 before it reaches the mount inlets 42.

It will be apparent to those knowledgeable in the art that this configuration of air flow path is exemplary only, and that other configurations may be equally suitable. In particular, in an embodiment of an air intake system with no outflow mount, an air flow path would be defined by the screen 30 and lower surface 28, and would extend from the intake apertures 24 to the mount outlet 44.

The air flow path 50 is shaped such that air traveling therethrough must move in a non-linear fashion. That is, air flowing from the intake apertures 24 to the mount outlet 44 must travel in a curve or around at least one corner. Arrows marked on FIG. 2 indicate exemplary directions of air motion within the air flow path 50.

Advantageously, the air flow path 50 is shaped so that air traveling therethrough must travel upward through the screen 30, rising near the intake apertures 24 and falling near the mount outlet 44. Such a configuration is particularly effective for preventing the movement of debris along with flowing air.

In addition, for an air flow path 50 that passes upwards through a screen 30, any debris stopped by the screen 30 will be on the underside of the screen 30. It is thus unlikely that debris will adhere to or accumulate on the screen 30, since gravity tends to remove any debris attached to it. Vibrations and shocks, as from the engine and from the motion of the vehicle, will also tend to loosen any debris. Thus, the screen 30 is at least partially self-cleaning.

Furthermore, as illustrated the screen may be shaped so as to be generally parallel with the lower surface 28 of the second portion 22 of the hood 20. This is advantageous, in that the shape of the hood 20 in the embodiment illustrated yields an air flow path 50 with non-linear air flow while taking up relatively little volume. However, it will be apparent to those knowledgeable in the art that this shape is exemplary only, and that other shapes may be equally suitable.

As shown, the embodiment illustrated comprises an air plenum 60 removably engaged with the mount outlet 44. The air plenum 60 is adapted to provide air to an engine, in particular to an internal combustion engine. The air plenum 60 serves to further baffle and disrupt the flow of sound from the engine. The removable engagement permits the easy engagement and disengagement of the screen mount 40 and the plenum 60, e.g. when opening and closing the hood 20. However, it will be apparent to those knowledgeable in the art that this configuration is exemplary only, and that other configurations of plenum, including but not limited to a plenum that is flexible to accommodate motion of the hood with or without being removably engagable, or no plenum at all, may be equally suitable.

For embodiments of an air intake system 10 that comprise a plenum 60, the plenum 60 comprises at least a portion of the airflow path 50.

The air intake system 10 may also define a further intake aperture 25 provided in addition to or instead of the intake apertures 24. The further intake aperture 25 may be located nearer the operator, for example in front of the windshield, and may have a non-zero exposed area in the upper surface 26 of the hood 20. Air entering through the further intake aperture 25 enters the air flow path 50 as does air entering the intake apertures 24. Advantageously, air entering through the further intake aperture 25 also travels upward through the screen 30, rising near the further intake aperture 25 and falling near the mount outlet 44. In the exemplary configuration shown, a further intake aperture 25 is illustrated with a particular shape and location. However, it will be apparent to those knowledgeable in the art that a further intake aperture 25 with a different configuration, or no further intake aperture 25 at all, may be equally suitable.

The air intake system 10 may comprise a variety of generally durable materials. Suitable materials include but are not limited to plastic, metal, and fiberglass. The air intake system may also comprise filters, seals, and engagement mechanisms. Such devices are well known, and are not detailed further herein.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An air intake system for a vehicle, said air intake system comprising:
    a first hood member positioned between a front end and a steering member of said vehicle, said steering member being operable from a user seating positioned on the vehicle;
    a second hood member positioned over a portion of a top primary surface of said first hood member;
    at least one air intake;
    an engine air inlet in communication with said at least one air intake, said engine air inlet being positioned frontward of an engine of said vehicle;
    an air flow path from said at least one air intake to said engine air inlet, said airflow path extending in a direction from said steering member towards a front end of said vehicle;
    a screen layer interposed between said at least one air intake and said engine air inlet such that all air flowing through said air flow path must pass through said screen layer;
    wherein said air flow path rises between said at least one air intake and said screen layer, such that all air passing through said screen must rise while passing through said screen layer.

2. The air intake system according to claim 1, wherein said at least one air intake is defined between said first and second hood members.

3. The air intake system according to claim 1, wherein said at least one air intake is defined around a portion of a peripheral edge of said second hood member.

4. The air intake system according to claim 1, wherein wherein said at least one air intake includes an air intake defined between said second hood member and a windshield of said vehicle.

5. The air intake system according to claim 1, wherein said first and second portions comprise a single, integral piece.

6. The air intake system according to claim 1, wherein said at least one air intake is configured such that said at least one air intake defines substantially zero area of projection on a plane above said first and second hood members as viewed from above said hood members.

7. The air intake system according to claim 1, wherein said second hood member extends horizontally beyond said at least one air intake.

8. The air intake system according to claim 1, wherein said second hood member further comprises a lower surface, and wherein said screen layer is engaged with said lower surface of said second portion such that said screen layer and said lower surface cooperate to define a cavity therebetween, said cavity defining at least a portion of said air flow path.

9. The air intake system according to claim 8, wherein said screen layer is removably engaged with said lower surface of said second portion.

10. The air intake system according to claim 8, wherein said screen layer comprises an outer edge, said outer edge being in contact with said lower surface of said second portion.

11. The air intake system according to claim 9, further comprising an edge mounting mechanism engaged with an outer edge of said screen layer.

12. The air intake system according to claim 8, wherein said screen layer defines a screen aperture therethrough.

13. The air intake system according to claim 12, further comprising a screen mount engaged with said screen aperture.

14. The air intake system according to claim 2, further comprising an air plenum defining at least a part of said air flow path, said air plenum being in communication with said engine air inlet.

15. The air intake system according to claim 13, further comprising an air plenum defining at least a part of said air flow path, said air plenum being in communication with said engine air inlet, wherein said screen mount and said air plenum are removably engaged.

16. The air intake system according to claim 1, wherein said screen extends along substantially an entire length of said second hood member.

17. The air intake system according to claim 1, wherein the screen is arranged such that debris filtered from air flowing through said screen layer along said air flow path is pulled away from said screen layer by gravity.

18. The air intake system according to claim 3, wherein said first and second hood members are removably secured to each other.

19. A method for drawing air into an engine of a vehicle, said vehicle including first and second hood members, at least one air intake, a screen layer, a steering member, and an engine air inlet, said method comprising the steps of:
   positioning said first and second hood members between a front end of said vehicle and said steering member;
   positioning said engine air inlet in said vehicle frontward of said engine;
   defining an air flow path-between said first and second hood members, said air flow path extending from said at least one air intake to said engine air inlet;
   positioning said screen layer in said air flow path between said at least one air intake and said engine air inlet; and
   drawing air through said at least one air intake and said screen layer into said air flow path, and from said air flow path into said engine air inlet, said screen layer being configured such that all air flowing into said air flow path must pass through said screen layer, said screen layer being configured such that all air passing through said screen layer must rise while passing through said screen layer.

20. The method of claim 19, further comprising positioning a portion of said at least one air intake on the vehicle rearward of said engine.

21. The method of claim 19, wherein said engine air intake is closer to a front end of said vehicle tat said at least one air intake.

22. The method of claim 19, further comprising providing said at least one air intake along a top primary surface of said first hood member.

23. A snowmobile, comprising:
   a chassis;
   an engine supported in front end of the chassis;
   handlebars positioned rearward of the engine; and
   an air intake system for the engine, the air intake system comprising:
      a first hood member covering a portion of the engine and extending from the front end of the snowmobile towards the handlebars;
      a second hood member secured to a top primary surface of the first hood member;
      at least one air intake at least partially defined between the first and second hood members;
      an engine air inlet in communication with the engine and the at least one air intake, the engine air inlet being positioned frontward of the engine; and
      a screen layer interposed between the at least one air intake and the engine air inlet such that air entering the engine air inlet through the at least one air intake passes through the screen layer;
      wherein air passing the screen layer rises while passing through said screen layer.

* * * * *

UNITED STATES PATENT AND TRADEMARK OFFICE
CERTIFICATE OF CORRECTION

PATENT NO. : 6,968,916 B2
DATED : November 29, 2005
INVENTOR(S) : Bergman, Ron

It is certified that error appears in the above-identified patent and that said Letters Patent is hereby corrected as shown below:

<u>Column 8,</u>
Line 18, change "tat" to -- that --.

Signed and Sealed this

Ninth Day of May, 2006

JON W. DUDAS
*Director of the United States Patent and Trademark Office*